Figure 1:
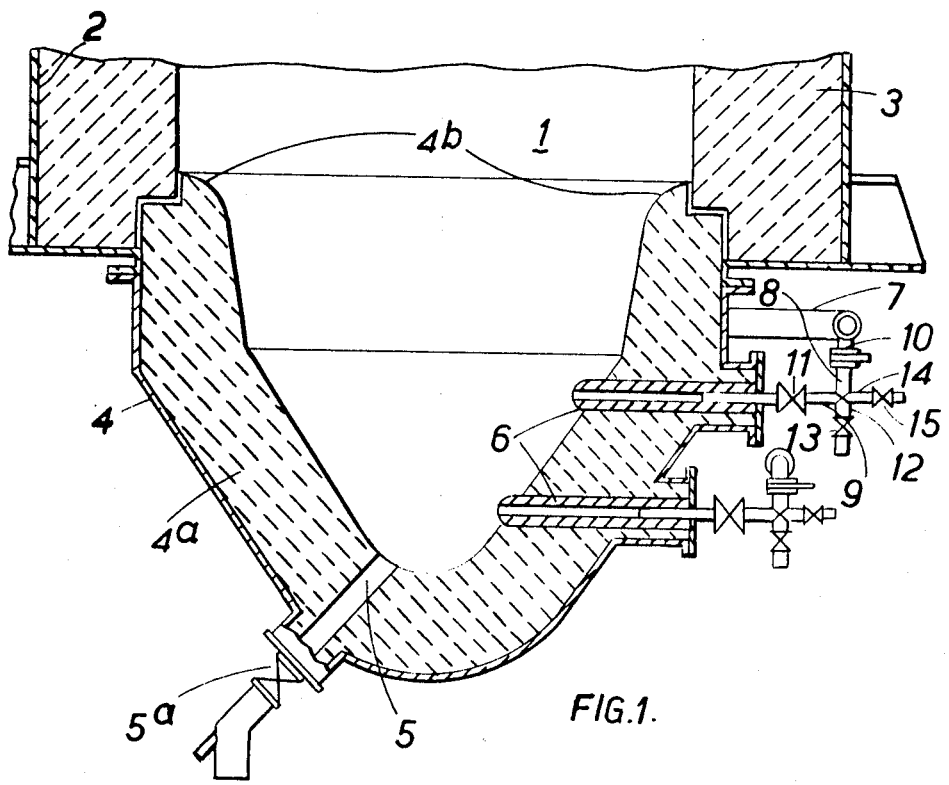

United States Patent

[11] 3,607,123

| [72] | Inventors | John Edward Russell<br>Low Worsall, Yarm;<br>Henry Garth Hudson, Stockton-on-Tees,<br>both of England |
|---|---|---|
| [21] | Appl. No. | 697,185 |
| [22] | Filed | Jan. 11, 1968 |
| [45] | Patented | Sept. 21, 1971 |
| [73] | Assignee | British Titan Products Company Limited<br>Billingham, England |
| [32] | Priority | Jan. 16, 1967 |
| [33] | | Great Britain |
| [31] | | 2319/67 |

[54] BASEPLATE ARRANGEMENT
7 Claims, 5 Drawing Figs.

[52] U.S. Cl. ................................................ 23/284,
202/241, 15/93, 23/87, 23/1
[51] Int. Cl. ............................................... B01j 1/00,
F27b 15/10, C01g 23/02
[50] Field of Search ....................................... 23/284.3,
284, 288.3 S, 87; 15/93; 202/241; 431/123

[56] References Cited
UNITED STATES PATENTS

| 380,910 | 4/1888 | McGee | 202/241 |
| 2,809,102 | 10/1957 | Hall | 23/284 |
| 2,827,371 | 3/1958 | Quin | 75/26 |
| 3,101,249 | 8/1963 | Prisco | 23/87 |
| 3,074,777 | 1/1963 | Cortes | 23/284 X |

Primary Examiner—James H. Tayman, Jr.
Attorney—Birch, Swindler, McKie & Beckett

ABSTRACT: The invention relates to a baseplate for a fluidized bed reactor the baseplate being perforated to hold inlet pipes for admitting gas into the reactor, the inlet pipe being provided with special means to enable loose obstructions to be removed therefrom. Specifically, the inlet pipe may be connected to a gas supply system having a valve located in the axial line of the inlet pipe, the valve being adapted to open to admit a rod therethrough and into the inlet pipe. The inlet pipe may be in the form of an elongated based plug having an outer surface tapered towards the end from which the gas is to issue, the inlet pipe being inserted through a correspondingly tapered perforation in the baseplate. The invention also relates to the use of such a baseplate in a fluidized bed reactor.

BASEPLATE ARRANGEMENT

This invention relates to apparatus for performing fluid bed reactions, and more particularly relates to a baseplate through which the fluidizing gas is passed.

The term baseplate is used in the art to cover the bottom portion of a fluid bed reactor and normally comprises a steel plate carrying a lining of refractory material or which is of refractory arched construction. Perforations are provided through the steel plate, lining or arch through which the fluidizing gas inlet pipes are passed. The baseplate can be of various shapes and may be separate from or integral with the body of the reactor.

With commercial fluid bed reactors of large diameter, many gas inlets have to be provided in the baseplate in order to ensure uniformity of fluidization in the bed particles above the baseplate. This has involved a number of mechanical and physical problems. It has been suggested to introduce the gas vertically through a number of inlets disposed over a flat baseplate, but this has the drawback that the inlet system is not so accessible and also that means (generally frangible) have to be provided to prevent bed material falling down into the inlet pipes.

It has also been suggested to introduce the gas through pipes protruding into the bed from the side of the bottom portion of the reactor, but there is still the danger of the inlet pipes becoming clogged with bed particles or with the product of some reactions.

If the inlet pipes become blocked, it has been necessary to stop the whole reaction and allow the reactor to cool down before cleaning the inlets and in this cleaning process it frequently happens that some of the inlet pipes are broken. The refractory lining of the baseplate has then to be broken up so that the inlet pipes can be removed therefrom. New inlet pipes are then put into position and another refractory lining has to be laid around them.

It is the object of the invention to avoid some or all of these disadvantages.

The invention provides a baseplate for a fluidized bed reactor, the baseplate being perforated and each perforation containing an inlet pipe for admitting gas into the reactor, the inlet pipe being connected to a gas supply system having a valve located in an axial line of the inlet pipe, the valve being adapted to open to admit a rod therethrough and into the inlet pipe so as to service and remove loose obstructions from the pipe. This can be done, for example, by causing the supply pipe in the supply system leading to the inlet pipe to be bent at an angle, and locating the said valve so that it is at the bend or in an extension pipe joined to the bend, so that the valve is axially in line with the inlet pipe.

The baseplate may have, instead of or in addition to the said valve, each inlet pipe in the form of an elongated based plug having an outer surface tapered towards the end from which the gas is to issue, the inlet pipe being inserted through a correspondingly tapered perforation in the baseplate, whereby the inlet pipe can be withdrawn, so as to service it and remove loose obstructions in it, without breaking up a refractory lining of the baseplate.

The gas main in the supply system (and indeed as much as possible of the supply system) is desirably situated above the inlet pipe. We have found that this unusual construction reduces the passage of material from the bed into the supply system.

The baseplate of this invention normally has the general shape of an inverted frustocone. The baseplate may be made integral with the wall of the reactor. In the latter case, the result will normally be a reactor having a tapered lower end holding the inlet pipes.

The inlet pipes are preferably substantially horizontal when the base plate is frustoconical.

When the inlets are to be cleaned, a rod may be inserted through the valve into the inlet pipe so as to remove loose obstructions therein, the rod may be hollow and a gas under pressure may be blown through it to assist in removing the obstructions.

Figure 2:
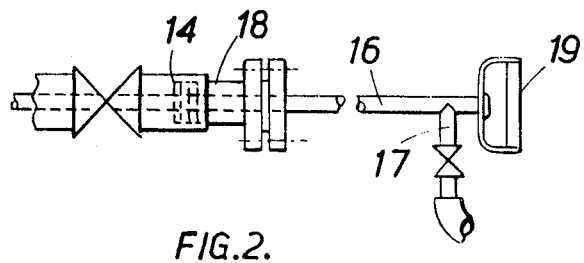
Figure 3:
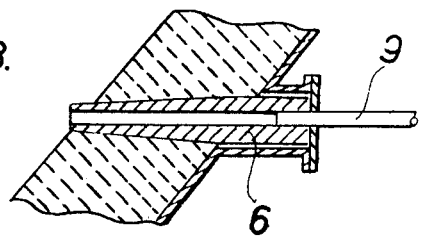
Figure 5:
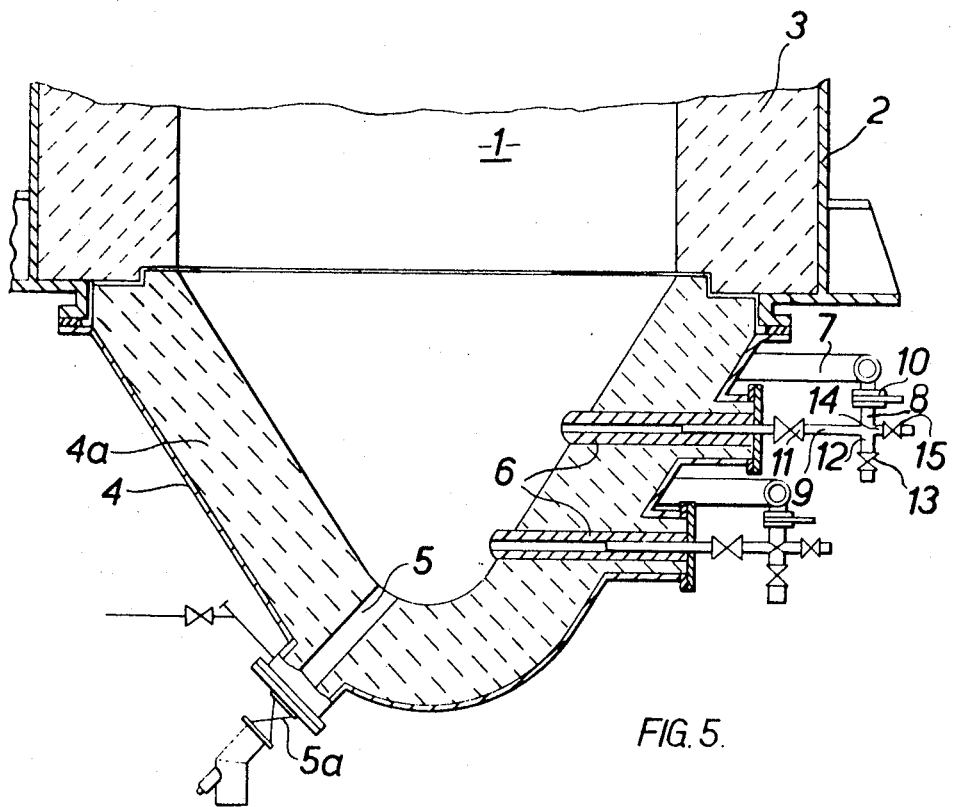
Figure 4:
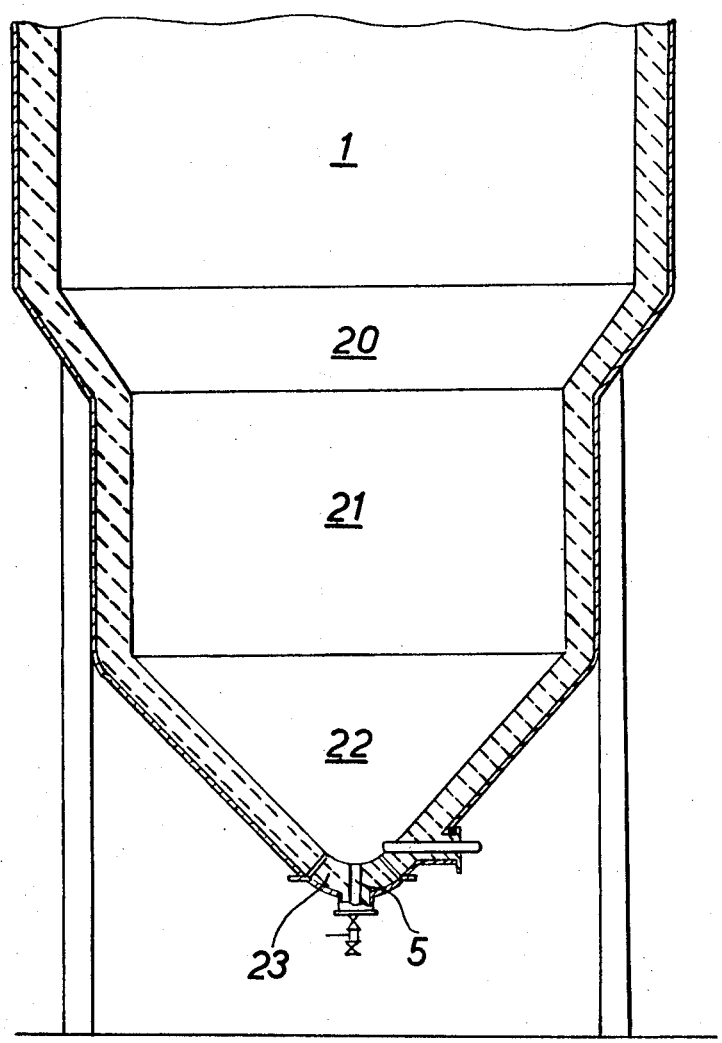

The invention is illustrated in the accompanying drawings in which:

FIG. 1 is a mainly sectional view of one form of separate base plate fitted to a reactor, FIG. 2 shows a "rodding out" arrangement, FIG. 3 is a sectional view of an alternative form of inlet pipe which is removable, FIG. 4 is a sectional view of an alternative form of baseplate which is integral with the reactor, and FIG. 5 is a mainly sectional view of an alternative form of separate baseplate fitted to a reactor.

In FIG. 1, a shaft furnace (mostly not shown) has a steel wall 2 and a refractory lining 3. A separate conical baseplate comprises a steel wall 4 with a refractory lining 4a. The refractory lining 4a of the baseplate is provided with a shoulder 4b running round the top edge for engaging with a corresponding protrusion in the refractory lining 3. This improves the seal between the baseplate and main body of the reactor. A drainage port 5 is provided at the bottom of the baseplate with valve 5a, so that the bed material can readily be withdrawn from the reactor. Refractory horizontal inlet pipes 6 are disposed in two rows around the tapering walls of the baseplate.

Fluidizing gas is supplied from above to the inlet pipes 6 from gas supply mains 7 via a vertical pipe 8 and a horizontal pipe 9. It will be seen that there is great advantage in providing the gas supply main pipe 7 above the inlet pipe 6 to which it is connected. This minimizes the chance of fluid bed particles getting into the gas supply system. Normally each gas supply main will be provided with a pressure gauge and an isolation valve.

Vertical pipe 8 is fitted with a removable gas-flow-controlling orifice 10 to control the distribution of the gas to the bed. Horizontal pipe 9 is provided with a valve 11, which enables all the upstream gas supply system to be removed for servicing. Vertical pipe 8 is provided with an axial extension pipe 12 having a valve 13. Horizontal pipe 9 is provided with an axial extension pipe 14 having valve 15.

If the inlet pipe 6 becomes clogged, valves 11 and 15 can be opened to allow the insertion of a cleaning rod straight through pipes 14, 9 and 6. A preferred procedure would be to open valve 15 first to allow the insertion of the rod, and then valve 11 can be opened to allow the rod to be pushed through further. This is to limit the escape of gas from the bed. Likewise, when withdrawing the rod, it would be withdrawn initially only just beyond valve 11 which would then be closed. The rod could then be fully withdrawn and the valve 15 is closed.

If the orifice 10 becomes clogged this can similarly be cleaned by means of a rod introduced through valve 13.

FIG. 2 shows a suitable form of cleaning rod for the inlet pipes 6. In this case, the rod 16 is hollow and its interior is connected to a high-pressure air supply pipe 17. The rod 16 is reciprocable within a collar stopper 18 which screws or otherwise fits into the end of the pipe 14 and forms a seal. Alternatively, the stopper 18 may fit over the end of pipe 14. The rod is provided with a handle 19. The provision of the high-pressure air supply trough the interior of the rod assists the cleaning of the inlet pipes 6 and also provides a pressure to counteract the escape of gases from the reactor.

In FIG. 3, the inlet pipe 6 is provided with a slightly tapering external surface to facilitate its insertion into and withdrawal from a correspondingly shaped aperture in the baseplate. The angle of taper can suitably be between 2° and 15°.

In FIG. 4, the baseplate is integral with the main body of the reactor. This, of course, simplifies construction and reduces supporting framework. It is, of course, only possible to have an integral baseplate if the inlet pipes 6 can be serviced, and preferably also removed, without removal of the baseplate, and that is a prime advantage of the present invention. Accordingly, with the construction of FIG. 4, it is preferred that the inlet pipe be of a removable type such as shown in FIG. 3.

FIG. 5 shows a larger reactor, and the baseplate is provided with four rows of inlet pipes 6 giving a greater flow of gas. The bottom portion of the reactor is, in this case, provided with an initial frustoconical portion 20 below which is a further cylindrical portion 21 below which is a conical portion 22. Gas rising past the frustoconical section 20 is slowed down to the correct velocity for the fluidized bed; therefore the construction enables a conical portion 22 to be used which is of smaller diameter than the main body of the reactor.

The apex of the conical base is provided with a removable portion 23 for facilitating drastic servicing such as removing clogged portions of bed material. The drainage port 5 is, in this case, provided in the removable portion 23.

The apparatus of FIG. 5 is generally similar to that of FIG. 1, and the reference numerals have the same meaning in both figures. The construction of the baseplate is however simplified in that the apparatus of FIG. 5 does not have the shoulder portion 4b of FIG. 1.

The included angle of the apex of the conical baseplate used with the present invention will normally be between 36° and 120°, but preferably between 45° and 75°. There will normally be between 0.2 and 5 inlets per square foot of bed cross section, but it is preferred that there should be 1 or 2 inlets per square foot of cross section. The gas-flow-control orifices 10 are preferably of fixed diameter and made to close specifications. The hole may, for example, be in the range of about ¼ to 1½ inch.

The inlets into the reactor are normally spaced equidistantly around the base and there may be any number of rows, preferably from 1 to 4 containing, say, from 4 to 12 inlets each (as the cross section increases the number of inlets increases).

The present invention is applicable to a wide variety of fluid bed reactions. It is specially useful for the chlorination of metals or metal ores to give metal chlorides, particularly the chlorination of titaniferous materials as exemplified in the following examples.

EXAMPLE 1

A cylindrical reactor is provided 4 feet 10 inches in internal diameter, lined with chlorine-resistant refractory brickwork and having a feed orifice for bed material above the bed and an exit duct in the upper part of the reactor for titanium tetrachloride vapor.

The lower portion of the reactor is as shown in FIG. 1 and comprises an inverted cone 3 feet 6 inches in depth (to the top of the shoulder 4b).

The included angle at the apex of the cone is 60° and through the wall project 2 rows of inlets, the lower row consists of 4 inlets 6 inches above the apex of the cone and spaced equidistantly around the internal periphery of the cone. The upper row consists of 8 inlets 1 foot 8 inches above the apex of the cone.

The inlet pipes 6 and pipes 8 and 9 are about 1 inch in internal diameter. The gas supply main 7 is 2 inches in internal diameter.

The fixed orifice plate 10 is three-eights inch in internal diameter.

The bed is formed by introducing a mixture of 80 percent rutile and 20 percent coke into the reactor in such quantity that a bed (unfluidized) is formed to a height of 4 feet above the upper row of inlets.

The bed is heated with a gas poker to 700° C. while fluidized with air. The flow of air is then adjusted to 100 cu. ft./min. and the coke burned until the temperature of the bed reaches about 900° C.

The flow of air is then stopped and replaced by chlorine at a rate of about 2,300 lbs./hour at a pressure of about 15 p.s.i.g. in the gas supply mains.

Excellent fluidization and mixing of the bed takes place and the utilization of the chlorine is substantially 100 percent.

EXAMPLE 2

The reactor is similar to that of Example 1.

The bed is formed by introducing a mixture of 81 percent rutile and 19 percent coke into the reactor in such a quantity that a bed (unfluidized) is formed to a height of 5 feet 6 inches above the upper row of inlets.

The bed heated with a gas poker to 700° C. while fluidized with air and then the coke is allowed to burn by suitable adjustment of the flow of air, so that the temperature of the bed reaches about 1,000° C.

The flow of air is stopped and replaced by chlorine at a rate of about 2,500 lbs./hour at a pressure of about 14 p.s.i.g. in the gas supply mains.

A mixture of rutile and coke is fed into the bed throughout the experiment in an amount such that 1,500 lbs./hour of rutile and 290 lbs./hour of coke are added. On fluidization the height of the bed above the base flange was 6 feet 8 inches.

It is observed that excellent fluidization and mixing of the bed takes place and that the utilization of the chlorine is approximately 100 percent.

What is claimed is:

1. A fluidized bed reactor comprising a reactor portion,
   a one-piece inverted frustoconical baseplate beneath said reactor portion and attached thereto, the included angle of the apex of said frustoconical baseplate being between 36° and 120°
   a plurality of perforations in said baseplate, each of said perforations having therein a gas inlet pipe horizontally oriented and substantially radially aligned with respect to said baseplate, each of said gas inlet pipes being a bored plug having an outer surface tapering toward the interior of said baseplate and being inserted into a perforation having a corresponding tapered portion,
   a gas inlet valve on each of said gas inlet pipes, said valve being openable to atmosphere and having a flow path axially aligned with said gas inlet pipe, and
   a gas main communicating with each of said gas inlet pipes by means of a gas supply conduit intersecting said gas inlet pipe at a point between said inlet valve and said baseplate, each of said gas supply conduits terminating in a gas conduit valve openable to atmosphere and axially aligned with said gas conduit whereby a pipe-cleaning rod can be inserted through said inlet pipe valve to remove deposits from said inlet pipe, and through said conduit valve to remove deposits from said conduit.

2. The reactor of claim 1 wherein said gas main is located above the level of said gas inlet pipes.

3. The combination of claim 2 wherein each of said gas conduits includes a flow control orifice.

4. The combination of claim 3 wherein each of said gas inlet pipes includes a square valve between said gas conduit and said baseplate.

5. The reactor of claim 4 wherein there are 0.2–5 inlet pipes per square foot of horizontal cross section of the reactor.

6. The combination of claim 5 wherein said baseplate is formed integrally with said reactor.

7. A fluidized bed reactor comprising:
   a reactor portion,
   a one-piece inverted frustoconical baseplate beneath said reactor portion and attached thereto,
   said one-piece inverted frustoconical baseplate being composed of two portions, the top portion being frustoconical and having an included angle of the apex between 36° and 120° and the bottom portion being frustoconical and having an included angle of the apex between 36° and 120°, the said included angle of the apex of the bottom portion and the said included angle of the apex of the top portion being different,
   a plurality of perforations in said baseplate, each of said perforations having therein a gas inlet pipe horizontally oriented and substantially radially aligned with respect to said baseplate,
   a gas inlet valve on each of said gas inlet pipes, said valve being openable to atmosphere and having a flow path axially aligned with said gas inlet pipe, and a gas main communicating with each of said gas inlet pipes by means of a gas supply conduit intersecting said gas inlet pipe at a point between said inlet valve and baseplate, each of said gas supply conduits terminating in a gas conduit valve openable to atmosphere and axially aligned with said gas conduit, whereby a pipe-cleaning rod can be inserted through said inlet pipe valve to remove deposits from said inlet pipe, and through said conduit valve to remove deposits from said conduit.